Feb. 10, 1970  TEIJI ITO ET AL  3,494,019
PROCESS FOR BUTT WELDING OF IRONS AND STEELS
Filed May 24, 1965

INVENTORS
Teiji    Ito
Takeshi  Nishi
Koh      Moriyama

BY
Wenderoth, Lind & Ponack,
attorneys

United States Patent Office 3,494,019
Patented Feb. 10, 1970

3,494,019
PPROCESS FOR BUTT WELDING OF IRONS AND STEELS
Teiji Ito, Takeshi Nishi, and Koh Moriyama, Kitakyushu, Japan, assignors to Yawata Iron & Steel Co., Ltd., Tokyo, Japan
Filed May 24, 1965, Ser. No. 458,266
Claims priority, application Japan, May 29, 1964, 39/30,181
Int. Cl. B23k 11/02
U.S. Cl. 29—483                                    7 Claims

ABSTRACT OF THE DISCLOSURE

A method of butt welding ferrous materials, comprising the steps of forming a groove along the opposed edges of the materials to be welded on at least one side of the materials, said groove having at least two portions, the deeper portion which is more remote from the surface of the materials and the shallower portion which is adjacent the surface of the materials, the deeper portion of the groove having opposed faces at one angle with respect to each other, and the shallower portion having opposed faces at a larger angle with respect to each other than the one angle between the opposed faces of the deeper portion of the groove, and then butt welding the materials by a conventional butt welding technique.

---

This invention relates to a process for butt welding of iron and steel materials and more particularly to a butt welding process for giving an improved strength to the welded portions of high tension steel or ultra high tension steel for structure materials.

The brittle fracture of structure materials of steels is liable to occur mainly at welds particularly the heat-affected zone. That is, the defect is caused by the fact that the structure of the weld of steel to be affected by heating during welding is changed by heat of welding and, in particular, the toughness of the weld is reduced due to the increase of the grain size of crystal, which results in concentrating stress there. Recently, steel materials having a high strength has been required for structure materials and in order to meet the requirement, many attempts have been provided to give a high tensile strength or ultra high tensile strength to steels. However, in the case of using these steel materials as structures by applying a welding, it is necessary that the strength of welds and particularly the toughness of the heat-affected zone are as high as those of the base materials and for the purpose a high welding technique is required.

However, by conventional welding techniques that have hitherto been practiced, it is impossible to remove completely the defects of the welds and the heat-affected zone of high tension steel or ultra high tension steel as well as to meet the above requirements in view points of welding procedures and non-destructive testing for detecting small defects.

Therefore, an object of the present invention is to provide a welding process for the above-mentioned structure materials, in particular, such as, high tension steel and ultra high tension steel in which by adopting multi-step edge sections of the steel materials to be welded, the heat-affected zone are extended along the direction running nearly parallel with the surface of the steel material.

Another object of this invention is to provide a welding process in which the heat-affected portions of the welds have a high strength even when a high-heat input is applied in welding.

Figure 1:
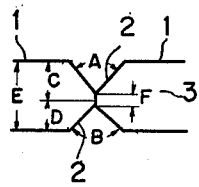
Figure 2:
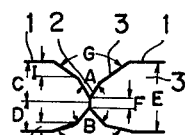
Figure 3:
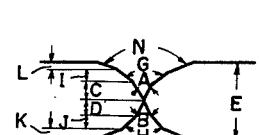
Figure 4:
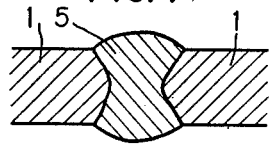
Figure 5:
Figure 13:
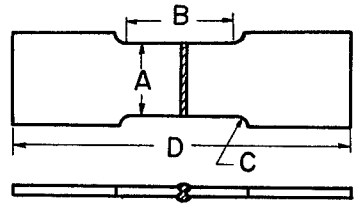

These and other objects of this invention will become clear from the following description referring the accompanying drawings, in which:

FIG. 1 shows several examples of conventional edge preparations in butt welding of steel plates, FIG. 2 shows an example of the joint groove of this invention in butt welding of steel plates, FIG. 3 shows other example of the joint groove of this invention in butt welding of steel plates, FIG. 4 shows a cross-sectional view of the weld in the case of applying butt welding using the conventional groove shown in FIG. 1, FIG. 5 shows a cross-sectional view of the weld in the case of applying butt welding using the joint groove of this invention shown in FIG. 2, FIG. 6 to FIG. 8 show the fractured portions by tension test of the welds in the case of applying butt welding using conventional groove, FIG. 9 to FIG. 12 show the fractured portions by tension test of the welds in the case of applying butt welding using the groove of this invention, and FIG. 13 shows the shapes of the welds when a wide tension test is applied.

In the case of conducting butt welding of steel plates, the edges 2 of base materials 1 to be welded are shaped into a simple-shape groove, e.g., an X-shaped groove as shown in FIG. 1 for securing a necessary amount of welding metal. However, when butt welding is carried out using such a conventional simple-shape groove, the heat-affected zone is formed in a direction comparatively perpendicular to the surface of the plate and in a comparatively narrow zone. In the heat-affected zone, the grain size of crystal of the base material is coarsened by the heat of welding and the zone becomes brittle as compared with other portions of the base material. If such a steel material welded by a conventional manner is used as a structure material, there is a large possibility that stress is concentrated to the narrow heat-affected zone having a weak strength and toughness, which results in destroying the portion. The same is true in the case of adopting conventional H-shaped, U-shaped, V-shaped, Z-shaped and I-shaped joint groove.

According to the process of this invention, in a butt welding process for iron and steel materials, the joint grooves of the iron or steel materials to be butt welded are formed into two or more step sections such that the angle of groove at an inner side of the gap or space between both edges is larger than that at an outer side, whereby the area of the welded surface of metal at the weld can be enlarged. The examples of the angle of the joint groove by this invention are shown in FIG. 2 and FIG. 3. That is, in FIG. 2 is shown an X-shaped (or double-V) groove having a slanting plane 2 for forming the 1st step angle of groove and a slanting plane 3 for forming the 2nd step angle of groove wider than that of the 1st step groove. In FIG. 3 is shown an example of the three-step groove by this invention wherein a slanting plane 4 for giving the 3rd step angle of groove much wider than the 2nd step angle is additionally formed at the outside of the 2nd slanting plane 2 in FIG. 2. On conducting butt welding by using such a multi-step groove, the H-type weld of a large area of the welded metal 5 is obtained. Therefore, the brittle heat-affected zone is spread over in nearly parallel with the plane of the steel plate and the heat-affected zone is extended to the lengthwise direction of the steel plate also, whereby the possibility of concentrating stress to the narrow portion is extremely reduced.

Hence, by the process of this invention, in butt welding of, in particular, high tension steel or ultra high tension steel, the strength of the weld can be increased, the formation of crack in the weld can be prevented, and, even if cracks are formed, the crack propagating energy is markedly increased to prevent the propagation of crack formation.

In order to form the groove for obtaining a desired amount of the welded metal in the process of this invention, a comparatively step-slanting plane 2 for giving 1st step angle of groove is formed at the top side of the edge of the steel plate and further a comparatively loose-slanting plane 3 or 4 is formed at the outside of the 1st slope for obtaining a larger spreading of the welded metal. The joint groove by the process of this invention may be formed into two or three steps as mentioned above, however it may be of course formed into four or more steps. In this respect, however, it is preferable in the case of forming three or more step groove to decide the form on considering the thickness of the steel plate to be welded and economy for fabricating the plate.

Furthermore, the form of the groove may be a convexed circle in the process of this invention. Heretofore, the invention is explained about the case where the shape of the groove is an X-shaped (or double V-shaped) one but the invention is not limited to only the case but is applicable in the case of adopting U-shaped, V-shaped, Z-shaped, Y-shaped or I-shaped groove, which may be symmetric or asymmetric.

The butt welding process of this invention may be applied to a coated metal arc welding, carbon dioxide gas welding, inert-gas arc welding, submerged-arc welding, and other all fusion weldings. At that, the effect for preventing low-stress fracture is particularly larger when the process of this invention is applied to a welding operation requiring a large heat input.

The following example is illustrative of the butt welding process of this invention without in any way being limiting.

Example.—A high tension steel plate having the composition and the tensile strength shown in the following table was used.

TABLE 1

[Composition in weight percent and tensile strength in kg./sq. mm.]

| | |
|---|---|
| C | 0.17 |
| Si | 0.30 |
| Mn | 0.90 |
| P | 0.011 |
| S | 0.09 |
| Cu | 0.24 |
| Ni | 1.24 |
| Cr | 0.60 |
| Mo | 0.56 |
| V | 0.06 |
| B | 0.02 |
| Tensile strength | 105 |

Butt welding was conducted by adopting a conventional groove shown in FIG. 1 and the grooves of the present invention shown in FIG. 2 and in FIG. 3. The angles of edge, dimensions of the groove, thickness of the plates, etc., are shown in Table 2, wherein the symbols A–N correspond to the symbols A–N shown in FIG. 1 to FIG. 3.

TABLE 2.—DIMENSION OF GROOVE AND THICKNESS OF PLATE

| Test piece No. | A, ° | B, ° | C, mm. | D, mm. | E, mm. | F, mm. | G, ° | H, ° | I, mm. | J, mm. | K, mm. | L, mm. | M, ° | N, ° |
|---|---|---|---|---|---|---|---|---|---|---|---|---|---|---|
| 1, 2 | 60 | 90 | 12 | 7.2 | 19.2 | 1.5 | | | | | | | | |
| 3 | 60 | 90 | 24 | 14 | 38 | 2 | | | | | | | | |
| 4, 5 | 60 | 90 | 12 | 7.2 | 19.2 | 1.5 | 140 | 140 | 4 | 4 | | | | |
| 6 | 60 | 90 | 24 | 14 | 38 | 2 | 140 | 140 | 7 | 7 | | | | |
| 7 | 60 | 60 | 10 | 10 | 38 | 0 | 100 | 100 | 5 | 6 | 4 | 3 | 140 | 140 |

The welding conditions are shown in Table 3 together with the results of wide tension tests. The test piece has the form as shown in FIG. 13, in which $a$ is 420 mm., $b$ 606 mm., $c$ 70 R and $d$ 960 mm.

TABLE 3.—WELDING CONDITIONS AND TEST RESULTS OF WELDS

| Test piece No. | | Plate thickness | Welding position | Fracturing strength (kg./sq. mm.) | Welding heat (Joule/cm.) | Fractured portion | Brittle fracture percentage |
|---|---|---|---|---|---|---|---|
| 1 | Conventional X-shaped groove | 19.2 | Vertical | 67.6 | 42,000 | Heat-affected zone | 70 |
| 2 | | 19.2 | Downward | 99.6 | 20,000 | do | 40 |
| 3 | | 38 | do | 104.9 | 22,000 | do | 35 |
| 4 | Two-step groove | 19.2 | Vertical | 104.0 | 42,000 | Heat-affected zone and base material | 12 |
| 5 | | 19.2 | Downward | 105.4 | 20,000 | Base material | 0 |
| 6 | | 38 | do | 106.7 | 22,000 | do | 0 |
| 7 | Three-step groove | 38 | do | 105.6 | 40,000 | do | 3 |

Figure 6:
Figure 7:
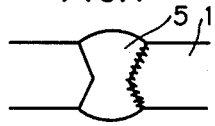
Figure 8:
Figure 9:
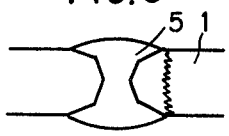
Figure 10:
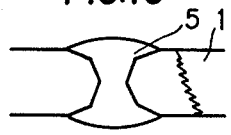
Figure 11:
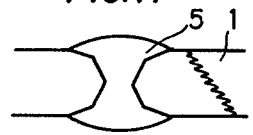
Figure 12:
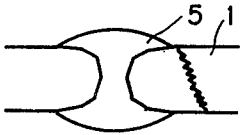

(Remarks: The fractured portions of test pieces are those which are drawn in jagged form as shown in FIGS. 6 to 12. FIG. 6, is that which corresponds to the test piece No. 1, FIG. 7, to the test piece No. 2, FIG. 8 to the test piece No. 3, FIG. 9 to the test piece No. 4, FIG. 10 to the test piece No. 5, FIG. 11 to the test piece No. 6 and FIG. 12 to the test piece No. 7.)

As shown in the above results, in the case of using the conventional X-shaped groove and adopting a large welding heat (Test piece No. 1, FIG. 6), the test piece was fractured at the butt welded portion at a low stress of 67.6 kg./sq. mm. and the brittle fracture percentage of the fracture surface in this case is about 70%. While, in the case of adopting the two-step and three-step groove by the present invention (Test piece Nos. 4–7, FIGS. 9–13), the strength of the joints was as high as that of the base materials even when butt welding of a large welding heat (Test piece Nos. 4 and 7, FIGS. 9–13) was conducted. In this case, the fractured position was not limited to the weld heat affected zone but over the area including a part of the base material and the heat affected zone, and the percentage occupied by the brittle fracture was 3% and 12%, which was extremely low as compared with that by using a conventional groove. Further, in the case of conducting the welding condition of a comparatively low welding heat input to the thickness of plate (Test pieces Nos. 3 and 6, FIGS. 8 and 11), although the danger of causing low-stress fracture is low even in the case of using the conventional X-shaped groove, the breaking strength of the test pieces was slightly larger than that of the conventional case and the brittle fracture percentage of the test pieces was less than that of the conventional case. Moreover, in conventional welding conditions of a low welding heat input, some welding position is inapplicable. That is, welding of a low welding heat input is difficult in vertical welding though it is possible in flat welding, horizontal welding, and overhead welding. Hence, this becomes a fatal defect in the construction of structures by using the conventional welding process. On the other hand, the welding process of this invention using the two or more step groove can be applied to the cases of requiring any welding heat and the effects by the process are large in every cases. Therefore, the process of this invention is particularly suitable for constructing structures.

As mentioned above, it is clear that the reinforcing effect for the welded joint by the process of this invention is sufficient and the trouble of brittle fracture is overcome by the process of this invention even in the case of welding high tension steel or ultra high tension steel.

The relations between the angles of the 1st and 2nd slanting planes of the two-step groove found by the inventors are shown in Table 4.

That is, in Table 4 are shown the results of the investigation about the strength of welded joints obtained by butt welding while changing variously the angle of the outer groove with 60° of the angle of the 1st groove. From the results, it is clear that the case of adopting 90° of the angle of the outer groove caused low-stress fracture in vertical welding of a large welding heat whereas the joint strength was stable in the case of adopting above 100° for the angle of the outer groove. This showed that by using the two-step groove having 90° of the angle of the outer groove, the brittle heat affected zone does not have the extension sufficient for preventing the occurrence of brittle fracture. In this meaning, it is concluded that the effect of this invention can be further increased by using the joint groove of larger angle.

TABLE 4.—RELATIONS BETWEEN THE ANGLES OF 1ST AND 2ND GROOVES

| | Plate thickness | Welding position | Welding heat (Joule/cm.) | Angle of groove, ° | Fracturing strength (kg./sq. mm.) |
|---|---|---|---|---|---|
| Two-step groove | 19.2 | Vertical | 42,000 | 90 | 88.6 |
| | 19.2 | do | 42,000 | 100 | 101.2 |
| | 19.2 | do | 42,000 | 120 | 103.4 |
| | 19.2 | do | 42,000 | 140 | 103.8 |

What we claim is:

1. A method of butt welding ferrous materials, comprising the steps of forming a groove along the opposed edges of the materials to be welded on at least one side of the materials, said groove having at least two portions, the deeper portion which is more remote from the side surface of the materials and the shallower portion which is adjacent the side surface of the materials, the deeper portion of the groove having opposed faces at one angle with respect to each other, and the shallower portion having opposed faces at a larger angle with respect to each other than the one angle between the opposed faces of the deeper portion of the groove, and the face of the shallower portion of the groove on each of the opposed edges being at a greater angle to a plane through the groove which is perpendicular to the side surface of the materials than the face of the deeper portion of the groove, and then butt welding the materials by a conventional butt welding technique, the angles of the faces of the groove being sufficient to cause the heat-affected zone of the materials to be spread within the materials nearly parallel with the side surface of the materials and to be extended transversely of the weld, whereby the concentration of stress in a narrow portion of the materials is greatly reduced, and thereby the formation of cracks in the weld can be prevented.

2. A method as claimed in claim 1 in which the step of forming the groove comprises forming a groove on both sides of the materials.

3. A method as claimed in claim 1 in which the angle of the opposed faces in the deeper portion of the groove is about 60° and the angle between the opposed faces of the outer groove is greater than 100°.

4. A method as claimed in claim 1 in which the groove is symmetric in form.

5. A method as claimed in claim 1 in which the groove is asymmetric in form.

6. A method as claimed in claim 1 in which the ferrous materials to be welded are of high tension steel for structural members.

7. A method as claimed in claim 1 in which the ferrous materials to be welded are of ultra high tension steel for structural members.

References Cited

UNITED STATES PATENTS

| 2,288,433 | 6/1942 | Boetcher et al. | 29—483 |
| 2,819,517 | 1/1958 | Pursell | 29—483 |
| 2,188,925 | 2/1940 | Ronay | 29—491 |
| 2,336,297 | 12/1943 | Rooke | 29—482 X |
| 2,662,277 | 12/1953 | Stone | 29—497 |

OTHER REFERENCES

American Welding Society, Welding Handbook, 1942, Mack Printing Co., pp. 1246–1249 relied upon.

American Welding Society, Welding Handbook, 1962, United Engineering Center, pp. 8.8–8.9 relied upon.

The Science and Practice of Welding by A. C. Davies, p. 164; published by University Press, Cambridge, Great Britain, third ed., 1947.

JOHN F. CAMPBELL, Primary Examiner

U.S. Cl. X.R.

29—497